H. E. HILL.
COMBINED BRACE AND ANTIRATTLER FOR BRAKE RODS.
APPLICATION FILED JAN. 20, 1915.
1,220,747.
Patented Mar. 27, 1917.
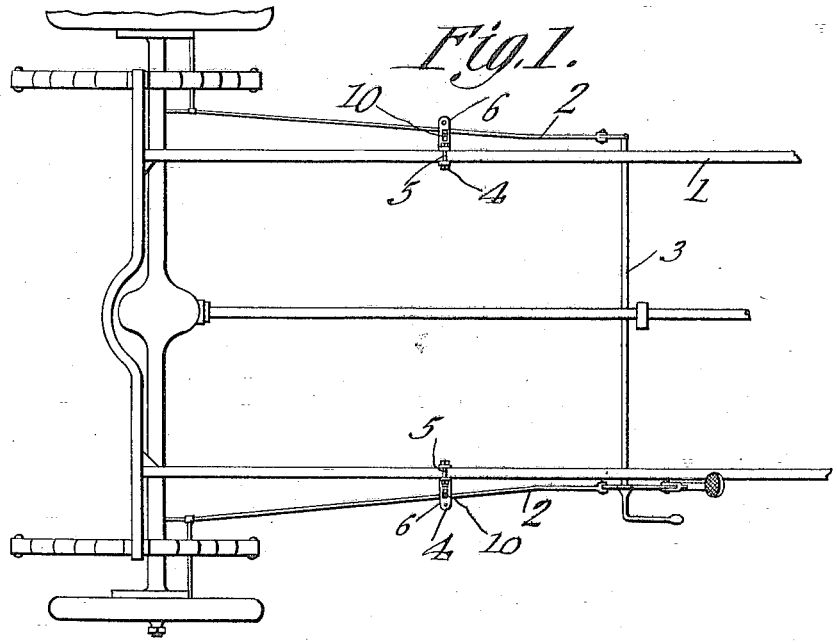
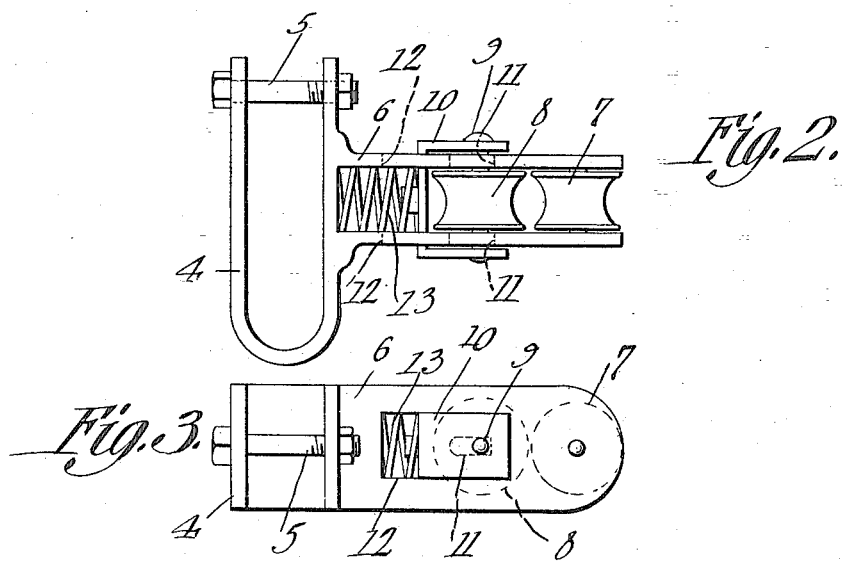
Witnesses
Inventor
H. E. Hill
by
Attorneys

UNITED STATES PATENT OFFICE.

HARVEY E. HILL, OF GALESBURG, MICHIGAN.

COMBINED BRACE AND ANTIRATTLER FOR BRAKE-RODS.

1,220,747.   Specification of Letters Patent.   Patented Mar. 27, 1917.

Application filed January 20, 1915. Serial No. 3,347.

*To all whom it may concern:*

Be it known that I, HARVEY E. HILL, a citizen of the United States, residing at Galesburg, in the county of Kalamazoo and State of Michigan, have invented a new and useful Combined Brace and Antirattler for Brake-Rods, of which the following is a specification.

This invention relates to a combined brace and anti-rattler especially designed for use in connection with brake rods of automobiles.

It is well known that in some types of automobiles the brake rods become worn where they work through their guides or braces and are thus not only weakened but also work loose and rattle while the machine is in motion.

One of the objects of the present invention is to provide a simple form of guide which can be applied readily to the chassis of an automobile and which affords means for holding and guiding a brake rod without subjecting it to undesirable friction and which furthermore serves to bind upon the rod to prevent it from rattling.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a plan view of a portion of an automobile having the present improvements combined therewith.

Fig. 2 is an enlarged front elevation of the attachment.

Fig. 3 is a plan view thereof.

Referring to the figures by characters of reference 1 designates a portion of the chassis of an automobile, the brake rods being indicated at 2 and the rod operating means being shown at 3. Each of the rods 2 is provided with a combined brace and guide which has been shown in detail in Figs. 2 and 3. Each of these attachments includes a U-shaped member or clip 4 designed to straddle the side bar of the chassis or any other suitable part of the vehicle and to be clamped thereon by means of a bolt 5 extending through the terminals of the clip. Extending outwardly from the clip are upper and lower parallel arms 6 journaled between the outer end portions of which is an anti-friction roller 7 the periphery of which is grooved as shown. Another like anti-friction roller 8 is mounted between the arms 6 and is journaled on a pin 9 which is secured within the ends of a yoke 10. This pin is slidably mounted within short longitudinal slots 11 provided in the arms 6 and the yoke is slidably mounted within short longitudinal slots 12 likewise formed in the arms 6. The intermediate portion of the yoke is engaged by a coiled spring 13 which bears against one side of the clip 4. This spring serves to hold the roller 8 normally pressed toward the roller 7 so that, when a brake rod is inserted between the two rollers 7 and 8, it will be firmly gripped between them. These rollers will thus hold the rod against rattling and at the same time will properly guide it without subjecting the rod to undesirable friction.

It will be noted that the device can be applied readily to a vehicle and constitutes a decided improvement over guides or braces such as heretofore employed and which have resulted in the rapid wearing of the rods with the resultant disadvantages hereinbefore enumerated.

What is claimed is:—

A combined brace and anti-rattler attachment for brake rods, including attaching means, superposed arms carried thereby, a yoke slidably mounted within the arms, a roller movable with the yoke and between the arms, a roller fixedly mounted between the arms, said rollers constituting means for engaging opposed portions of a brake rod, and yielding means engaging the yoke for holding its roller normally pressed toward the other roller.

In testimony that I claim the foregoing as my own, I have hereto affixed my signature in the presence of two witnesses.

HARVEY E. HILL.

Witnesses:
 ISAAC M. FLINTS,
 DEWEY G. JONES.

Copies of this patent may be obtained for five cents each, by addressing the "Commissioner of Patents, Washington, D. C."